March 1, 1960     L. H. EWALD     2,927,193
METHOD OF WELDING AND WELD PRODUCED THEREBY
Filed Aug. 24, 1956
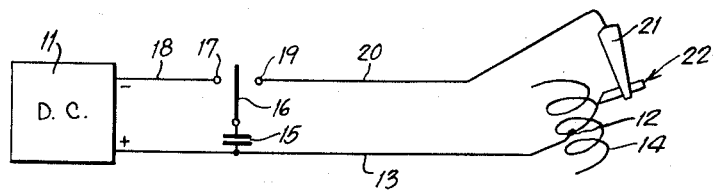
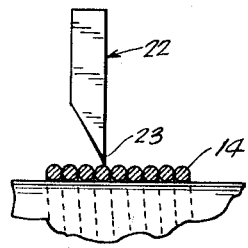 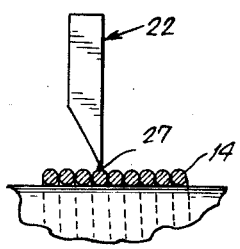
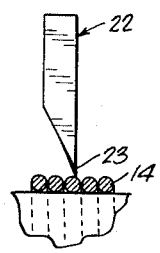 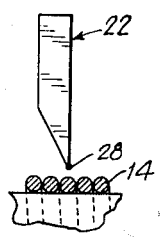 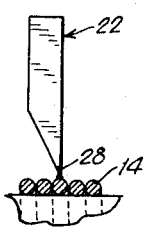 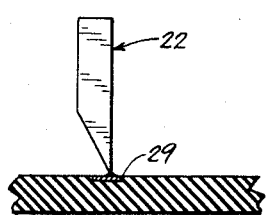
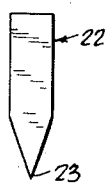  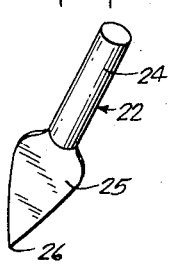
INVENTOR.
LUX H. EWALD
BY
Leo C. Krazinski
ATTORNEY

… … …

United States Patent Office 2,927,193
Patented Mar. 1, 1960

2,927,193

METHOD OF WELDING AND WELD PRODUCED THEREBY

Lux H. Ewald, New York, N.Y.

Application August 24, 1956, Serial No. 606,099

2 Claims. (Cl. 219—100)

The present invention relates to the art of welding and, more particularly, to the electric welding of a connection including fine filaments or wires having a cross sectional area of less than .0005 square inch and other metal elements having a thickness of less than .005 inch, such connections being required in potentiometers and printed circuits having elements so dimensioned.

It has long been known that in an electric arc between two metallic electrodes material is transferred from one electrode to the other. In direct current circuits this leads to the well known build-up on the positive contact point and pitting of the negative contact point. This process has been investigated quite thoroughly and is described in some detail in the technical literature. See, for instance, "P. R. Mallory & Co., Electrical Contacts Data Book," 1946, p. 13.

This transfer of material leads to a welding of the two electrodes between which the arcing takes place, provided the length of the arc, the conditions of thermal conductivity of the electrodes, and the material of the electrodes are suitably chosen. In the design of electrical contacts for relays and other current carrying devices great care is taken to minimize this welding action. In the present invention the elements are chosen so as to promote the welding action.

In one process for welding tap connections to thin wire wound potentiometers use is made of this effect of material transfer in an arc. The arc is created by connecting the tap wire to one side of a charged condenser and the other wire to the other side of the condenser. The two wires are then brought together until a spark discharge takes place and a weld is made. Such a process is disclosed in U.S. Patent No. 2,710,328, of June 7, 1955, issued to Robert E. Semple.

In the Semple patented process the tap wire has to be made of very fine wire, somewhat smaller in diameter than the wire with which the potentiometer is wound. This is necessary to avoid damage to the potentiometer winding during the spark discharge. The small diameter of the tap wire gives it an undesirably high electrical resistance, and this in turn makes it mandatory that the length of wire which carries the welding current extremely short—usually of the magnitude of 1/32 of an inch. The relatively high resistance of the finished tap connection leads to high "terminal resistance" in the potentiometer, which high resistance is undesirable in some applications, and the necessity to hold a very short portion of the tap wire which requires a considerable degree of manual skill by the operator, as well as high power optical magnification to observe the process. It also makes it unsuitable for mechanical (non-manual) or automatic operation.

In the present invention the necessity for a very fine tap wire is eliminated by the use of foil instead of wire. To prevent damage to the potentiometer winding the foil is cut at an angle, coming to an acute point. By this method the cross sectional area at the welding tip is less than that of the winding, but immediately behind the welding tip the width of the foil provides a low resistance path for both the welding current and for the potentiometer tap connection.

Furthermore, it is no longer necessary to approach the tap to the winding in order to cause an arc to form. Instead, the tap foil is rested lightly (with a pressure of the magnitude of .3 gram) on the winding and the switch to the condenser is closed. Because of the inevitable oxide layer on the two conductors and the low contact pressure, contact is limited to microscopically small spots which form "liquid bridges" of metal that immediately melt away, and initiate an arc between the foil and the winding. This will cause the tip of foil to melt and, by metal migration, weld itself to the winding. The foil will melt more readily than the winding, and the polarity is so chosen that migration takes place from the foil to the winding, thus preventing damage to the winding.

Accordingly, an object of the present invention is to overcome the foregoing difficulties and objections by eliminating the need of such extremely small tap wires.

Another object is to provide an improved method of welding taps to fine wires or other minute elements wherein the tap can be lightly rested upon an electrical conductor and the weld readily made without impairment to the conductor.

Another object is to provide such a method of welding wherein the apparatus is simplified and the manipulative steps can be carried out more readily.

A further object is to provide a weld between such elements which weld has greater mechanical strength and has a lower electrical resistance, of such a value that variations in the tap lead will not upset intended resistance values of the network in which the weld is formed.

Other and further objects will be obvious upon an understanding of the illustrative embodiment about to be described, or will be indicated in the appended claims, and various advantages not referred to herein will occur to one skilled in the art upon employment of the invention in practice.

In accordance with the present invention the foregoing objects are accomplished by utilizing a tap element which has an end portion of a thickness less than .025 inch and is formed with a narrow point.

Preferred embodiments of the weld and the method of its formation are illustrated in the drawing, wherein:

Fig. 1 is a diagrammatic view of the apparatus for making the weld.

Figs. 2 and 3 are schematic views illustrating one method of welding a tap to a winding.

Figs. 4, 5 and 6 are schematic views illustrating another method of welding a tap to a winding.

Fig. 7 is a schematic view illustrating a tap welded to a printed circuit.

Figs. 8, 9, 10, 11 and 12 illustrate various forms of tap elements in accordance with the invention which can be substituted for the tap element shown in Figs. 2 to 7.

Referring to the drawing in detail and more particularly to Fig. 1 thereof, the apparatus shown diagrammatically comprises a source of direct current 11, an electrode 12 connected by a wire 13 to the positive side of the source and applied to a winding 14, a capacitor 15 having one side connected to the wire 13, a single-pole-double-throw switch having a blade 16 connected to the other side of the capacitor and having one contact 17 connected by a wire 18 to the negative side of the source and having a second contact 19 connected by a wire 20 to a second electrode 21, and a metallic tap element 22 which is supported by the electrode 21 in electrical connection therewith and which is to be welded to the winding 14.

The tap element 22, as shown in Figs. 1 to 7, is a foil, ribbon or plate having a thickness less than .025 inch and a width of about .125 inch. One end of the element has a narrow triangular point 23 defined by side portions of the element disposed at an angle of between about 30° and about 60°. Preferably, the thickness of the element is about half that of the smallest transverse dimension of the winding 14, that is, the diameter thereof. In this manner, a cross-sectional area closely adjacent the tip of the point is slightly smaller than the cross-sectional area of the wire from which the winding is formed.

The cross-sectional area of the element more removed from the tip is sufficiently large to have a low electrical resistance, whereby the tap element may be held by the electrode 21 at a distance which is not critical and which is sufficient to enable the operator to clearly see the point while making the weld. The tap element may be of the same material as the wire of the winding or of a material compatible therewith, for example, nickel, or other weldable metals or alloys.

In Fig. 8, the point 23 is formed by converging side portions of the tap element.

In Fig. 9, the tap element is in the shape of an elongate parallelogram having a point 23 at each end thereof.

In Fig. 10, the tap element is a wire 24 having a diameter about that of the winding wire or greater and being flattened at 25 and formed with a point 26 which functions like the point 23.

In Fig. 11, the tap element is a hollow wire having a flattened portion formed with a point.

In Fig. 12, the tap element is folded to provide portions disposed preferably at right angles for stiffening the same, which portions are cut away at one end to form the point.

In connection with the description of the methods of making the weld about to follow, it will be understood that any of the tap elements illustrated and just described can be utilized in accomplishing the purposes of the present invention.

In Figs. 2 and 3, one method of making the weld is shown which comprises positioning the point or tip 23 of the tap element lightly on the winding wire 14, preferably at approximately a three-tenth gram pressure, at the point where the weld is to be made with the tap element and the winding in electrical connection, as shown in Fig. 1, moving the switch blade 16 into engagement with the contact 17 to charge the capacitor 15, and then moving the blade 16 into engagement with the contact 19 to discharge the capacitor, whereby an arc forms between the point 23 and the winding wire 14, which arc is of sufficient magnitude to fuse the tip of the point into a ball-like formation 27 and establish a weld between the point and the winding wire. The narrow point, coming to a minute tip promotes fusion of the tap element, so that a sufficiently large glob of material is assured to form a weld having high structural strength and relatively low electrical resistance.

In Figs. 4, 5 and 6, another method of making the weld is shown which differs from the method just described in that the point is first positioned (Fig. 4) to provide a small ball-like formation 28 at the tip of the tap element upon a light spark discharge, which also serves to clean the opposing areas. This formation is not large enough to cause fusion (Fig. 5), and then a heavier spark discharge is caused which discharge is sufficient to enlarge the formation 28 and make the weld (Fig. 6). This double discharge method provides a larger and stronger weld.

In Fig. 7, a tap element is shown welded to a portion 29 of a printed circuit having a thickness of between about .0003 and about .005 inch. Here again, the tap element may have a thickness of about half that of the smallest transverse dimension of the printed circuit portion 29, that is, the thickness thereof, whereby a strong, low resistance weld is provided without damage to the portion 29 upon spark discharge.

From the foregoing description, it will be seen that the present invention provides an improved method of welding, as well as a better weld produced thereby. By reason of the pointed tap element the operator can see what he is doing with much lower optical magnification, for example, a single large lens. Furthermore, because the tap element can be resting on the winding before the weld is made, an electrical circuit can be used to determine the proper place for welding, opposite the fixed electrode 12, thereby eliminating the need for visual observation. Also, another and important function of the pointed tap element is that the electrical resistance thereof increases at a predetermined rate as the tip thereof is approached, thus making it possible to induce spark discharge entirely without regard to controlling the rate of narrowing the gap between the elements. In this manner, the present method can be carried out more quickly with less skill and without sacrificing the quality of the weld but actually improving the same. In addition, the pressure of the pointed tap element on the winding is substantially negligible because of the thinness of the element.

As various changes may be made in the form, construction, and arrangement of the parts herein, without departing from the spirit and scope of the invention and without sacrificing any of its advantages, it is to be understood that all matters are to be interpreted as illustrative and not in any limiting sense.

What is claimed is:

1. The method of welding a tap foil to a wire of a potentiometer winding and the like, wherein the smallest diameter of the wire is less than 0.025 inch and wherein the tap foil has a portion of a thickness less than the wire and is formed with a narrow, angular point having side portions disposed between 30 degrees and 60 degrees, which method comprises positioning said narrow, angular point lightly on the wire of the first element at a pressure of about 0.3 gram, connecting said tap foil and said wire respectively to opposite sides of a charged capacitor and passing a current discharge from said capacitor in a direction first through said point and thence through the wire to fuse said point into a glob of material welded onto the wire.

2. A tap element having a conductive body portion of thin, flat foil brought to a narrow, angular point having side portions disposed at between 30° and 60°, wherein said point is of relatively high resistance in comparison to the resistance of said body portion.

References Cited in the file of this patent

UNITED STATES PATENTS

| 2,629,767 | Nelson | Feb. 24, 1953 |
|---|---|---|
| 2,696,575 | Fogg | Dec. 7, 1954 |
| 2,671,156 | Douglas et al. | Mar. 2, 1954 |
| 2,701,290 | Hart | Feb. 1, 1955 |
| 2,704,818 | North | Mar. 22, 1955 |
| 2,710,328 | Semple | June 7, 1955 |
| 2,728,881 | Jacobi | Dec. 27, 1955 |
| 2,748,235 | Wallace | May 29, 1956 |